United States Patent [19]

Hunsperger et al.

[11] Patent Number: 4,773,063
[45] Date of Patent: Sep. 20, 1988

[54] OPTICAL WAVELENGTH DIVISION MULTIPLEXING/DEMULTIPLEXING SYSTEM

[75] Inventors: Robert G. Hunsperger, Newark; Andrew J. Maltenfort, New Castle, both of Del.

[73] Assignee: University of Delaware, Newark, Del.

[21] Appl. No.: 671,132

[22] Filed: Nov. 13, 1984

[51] Int. Cl.$^4$ .............................................. H04B 9/00
[52] U.S. Cl. ..................................... 370/3; 350/96.11; 350/96.12; 350/96.19
[58] Field of Search ........................... 370/3; 455/619; 350/96.11, 96.12, 96.13, 96.14, 96.19, 162.11, 162.17; 324/77 K

[56] References Cited

U.S. PATENT DOCUMENTS 3,908,121 9/1975 Riseberg et al. ................... 370/3
4,279,464 7/1981 Colombini ..................... 350/96.12

FOREIGN PATENT DOCUMENTS 53-42043  4/1978  Japan ................................ 370/3
56-112143 9/1981  Japan ................................ 370/3
57-6812   1/1982  Japan ........................... 350/96.11
57-177104 10/1982 Japan ................................ 370/3
57-210685 12/1982 Japan ............................. 372/26

OTHER PUBLICATIONS

Miki et al.—Viabilities of the WDM Transmission System—IEEE Trans on Comm., vol. Com-26, No. 7, Jul. 1978, pp. 1082-1087.
Andriesh et al.—"Integrated-Optical Mixer"—Sov. J. Quantum Electronics 8(3), Mar. 1978, pp. 293-296.
Suhara et al.—"Monolithic Integrated Micrograting-"—Appl. Phys. Lett.—40(2)—15 Jan. 1982, pp. 120-122.
Delavaux et al.—"Design and Fabrication"—Applied Optics—vol. 23—No. 17—01 Sep. 1984—pp. 3004-3009.
Spear-Zino et al.—"Multiwavelength Monolithic Integrated" SPIE-vol. 239—Proc. Soc. Photo-Opt. Instum-Guided Wave Opt. and SAW Devices Systems and Application, (1980), pp. 293-298.
pp. 19, 20—"Electronics"/Mar. 24, 1986, "Toshiba Multiplexes Five Beams on One Fiber".
Hideaki Matsueda & Michiharu Nakamura, "Monolithic Integration of a Laser Diode, Photo Monitor, and Electric Circuits on a Semi-Insulating GaAs Substrate", pp. 779-781, 15 Mar. 1984/vol. 23, No. 6/Applied Optics.
D. B. Anderson, J. T. Boyd, M. C. Hamilton, R. R. August, "An Integrated-Optical Approach to the Fourier Transform", pp. 268-275, IEEE Journal of Quantum Electronics, vol. QE-13, No. 4, Apr. 1977.
W. J. Tomlinson, "Wavelength Multiplexing in Multimode Optical Fibers", pp. 2180-2194, Applied Optics/vol. 16, No. 8/Aug. 1977.
M. Seki, K. Kobayashi, Y. Odagiri, M. Skikada, T. Tanigawa, R. Ishikawa, "20-Channel Micro-Optic Grating Demultiplexer for 1.1-1.6 $\mu$m Band Using a Small Focusing Parameter Graded-Index Rod Lens", pp. 257-258, Electronics Letters/18th Mar. 1982/vol. 18, No. 6.

(List continued on next page.)

Primary Examiner—Joseph A. Orsino, Jr.
Attorney, Agent, or Firm—Connolly and Hutz

[57] ABSTRACT

A wavelength division method and system employing a radiation transmissive planar waveguide provided with collimating and focusing lenses and with a periodic radiation transmissive diffraction grating incorporating radiation reflecting elements in spaced array, preselected, in demultiplexing service, to separate into individual entities an optical signal input constituting a multiplicity of coherent radiation signals of different characteristic wavelengths transmitted simultaneously via the waveguide and, in multiplexing service, to consolidate a multiplicity of coherent radiation signals individually introduced to the grating via the waveguide along angular courses substantially coincident with the angular courses taken by individual radiation signals of corresponding wavelengths exiting the grating during demultiplexing service, and means directing the signals to dedicated receptors.

11 Claims, 3 Drawing Sheets

OTHER PUBLICATIONS

Ryuichi Watanabe & Kiyoshi Nosu, "Slab Waveguide Demultiplexer for Multimode Optical Transmission in the 1.0–1.4 μm Wavelength Region", pp. 3588–3590, Applied Optics/vol. 19, No. 21/1 Nov. 1980.

R. Watanabe, K. Nosu, Y. Fujii, "Optical Grating Multiplexer in the 1.1–1.5 μm Wavelength Region", pp. 108–109, Electronics Letters/Jan. 31, 1980/vol. 16, No. 3.

Koh-Ichi Aoyama & Jun-Ichiro Minowa, "Optical Demultiplexer for a Wavelength Division Multiplexing System", pp. 1253–1258, 15 Apr. 1979/vol. 18, No. 8/Applied Optics.

OPTICAL WAVELENGTH DIVISION MULTIPLEXING/DEMULTIPLEXING SYSTEM

FIELD OF THE INVENTION

The advent of single-mode optical fibers and lasers for optical signal transmission has begun to make wavelength-division multiplexing/demultiplexing economically advantageous. Thus far, research into increased fiber bandwidth and wider ranges of operating wavelengths for both laser transmission sources and optical receiver diodes has not been paralleled by adequate methods for both multiplexing and demultiplexing optical signals. State-of-the-art experimental wavelength-division multiplexers/demultiplexers are capable of multiplexing only about twenty, or fewer, channels, while being relatively complex, difficult to fabricate, and expensive.

BACKGROUND OF THE INVENTION

Insofar as the Applicants are aware, there are presently three types of wavelength-division-multiplexing methods in use today: (1) angular dispersion; (2) optical filters; (3) optical absorbers. Our invention utilizes the first of these methods.

The closest prior art known to the Applicants is contained in the literature articles "An Integrated-Optical Approach to the Fourier Transform" by D. B. Anderson, J. T. Boyd, M. C. Hamilton, and R. R. August in IEEE Journal of Quantum Electronics, Vol. QE-13, No. 4, April 1977, and "Wavelength multiplexing in multimode optical fibers" by W. J. Tomlinson, Applied Optics, Vol. 16, No. 8, August 1977, the latter being a general treatment of the state-of-the-art at the time of publication.

There exist a number of wavelength-division multiplexers which are, however, different from the Applicants' invention. The best of these utilize mirrored diffraction gratings in several configurations to achieve differing angular dispersion according to wavelength. Thus, M. Seki et al. disclosed a "20-Channel Microoptic Grating Demultiplexer for 1.1-1.6 $\mu$m Band Using a Small Focusing Parameter Graded-Index: Rod Lens," Electronics Letters, Vol. 18, No. 6, pp. 257-258 (1982). Their design was produced as a twenty-channel demultiplexer utilizing a preferentially-etched silicon echelette grating butted against a Selfoc rod lens. Watanabe and Nosu reported a "Slab waveguide demultiplexer for multimode optical transmission in the 1.0-1.4 $\mu$m wavelength region" in Applied Optics, Vol. 19, No. 21 pp. 3588-3590 (1980), which utilized a ground concave grating mirror attached to the end of a planar waveguide, normal to the plane of the guide. With this system the authors were able to demultiplex ten channels. They claim the advantages of (1) stable, rugged construction, (2) no antireflection coatings, and (3) reduced dimensions. Watanabe et al. reported an "Optical grating multiplexer in the 1.1-1.5 $\mu$m wavelength region" in Electronics Letters, Vol. 16, pp. 108-109 (1980), which could multiplex ten channels in the 1.1-1.5 $\mu$m wavelength range using a planar diffraction grating mirror made from anisotropically etched silicon. Aoyama and Minowa, in "Optical demultiplexer for a wavelength-division multiplexing system," Applied Optics, Vol. 18, No. 8, pp. 1253-1258 (1979), reported a demultiplexer for five channels in the 0.8-0.9 $\mu$m range using a commercially available grating mirror and homogeneous lenses.

None of the foregoing is as effective as the Applicants' invention which, besides, has economies in fabrication and use, and enlarged channel processing capabilities which completely surpass expectations.

SUMMARY OF THE INVENTION

This invention comprises a method and apparatus for wavelength-division demultiplexing and, with appropriate alterations, multiplexing.

In the preferred demultiplexing embodiment it utilizes an integrated optical planar waveguide formed on a substrate and provided with a periodic radiation transmissive diffraction grating and sensing means for the output of segregated optical signals to individual receptors. The grating bars must be sufficiently long for substantially Bragg diffraction to occur.

The transmissive diffraction grating can be fabricated by conventional techniques, including but not limited to: (1) etching grating bars into the waveguide surface; (2) depositing metal or dielectric bars on the waveguide surface; (3) inducing a surface acoustic wave of preselected period via a piezoelectric or magnetostrictive transducer in an acoustooptic waveguide material; (4) employing the electro-optic effect to produce a preselected periodic variation of the refractive index of the waveguide by applying an electrical potential across interdigitated contacts or across finger contacts using the substrate as a ground plane; (5) other methods capable of producing a periodic variation of the refractive index of the waveguide.

The utilization of wavelength-division multiplexer/demultiplexer units in conjunction with a single fiber optical link enlarges markedly the information transmission capacity of the system, thereby drastically reducing the cost per information channel in both materials of construction and installation. In comparison to frequency-division multiplexing which encodes several information channels electronically onto a single wavelength, wavelength-division multiplexing offers increased transmission speed and significantly reduced complexity of associated electronic support systems. It should be noted that wavelength-division and frequency-division are complementary multiplexing methods, and, thus, a high information capacity fiber-optic communication system would utilize both wavelength-division and frequency-division mutiplexing.

THE DRAWINGS

The following drawings constitute part of this disclosure, in which.

DETAILED DESCRIPTION OF THE INVENTION

Figure 1:
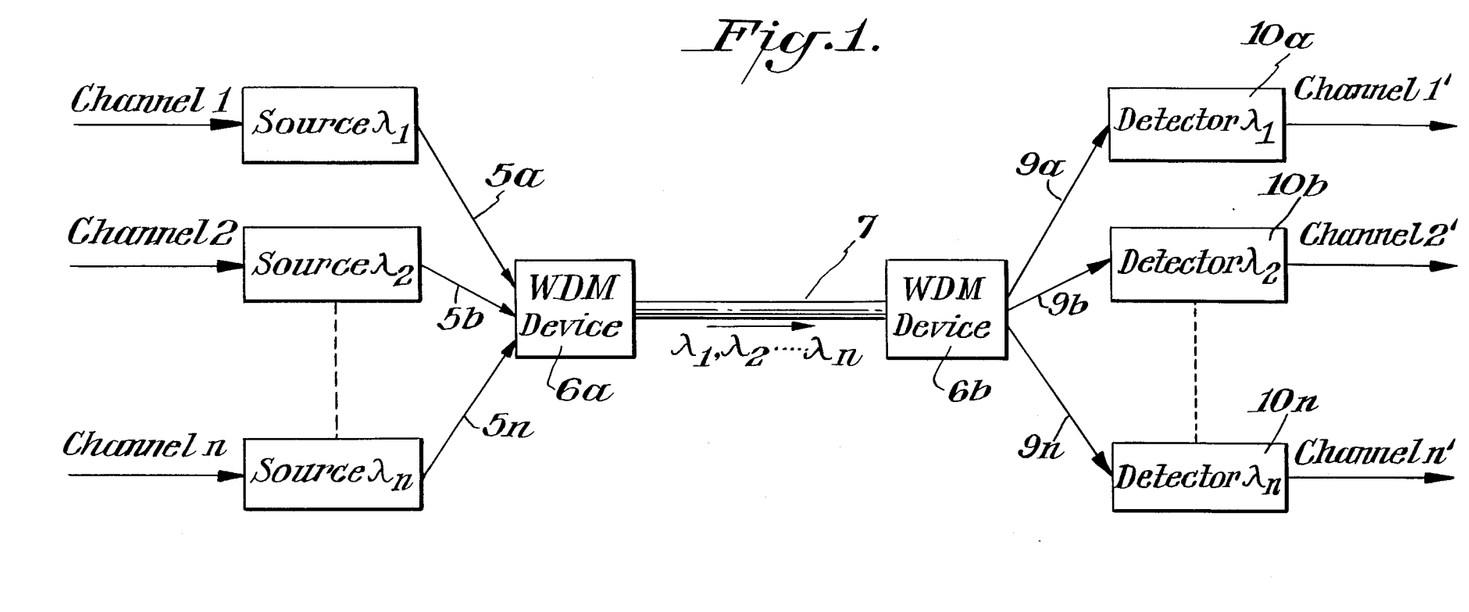
FIG. 1 is a schematic representation of a complete electro-optional fiber signal transmitting/receiving system.

Referring to FIG. 1, a conventional unidirectional fiber optic communication system utilizing wavelength-division multiplexing (WDM) comprises signal inputs 5a to 5n (received, respectively, from channels 1 to n) supplied to wavelength-division multiplexer (WDM) 6a which, conventionally, can be a known arrangement of beam splitters and lasers, the multiplexed signal from which is transmitted via a single optical fiber 7 to a receptor WDM device 6b (conventionally a prism, reflection grating, or multilayer thin-film dielectric filter arrangement) which resolves the composite signal into its component signal outputs 9a to 9n directed into individual detectors 10a to 10n which deliver information to their predetermined destinations, channels 1' to n'.

Figure 2:
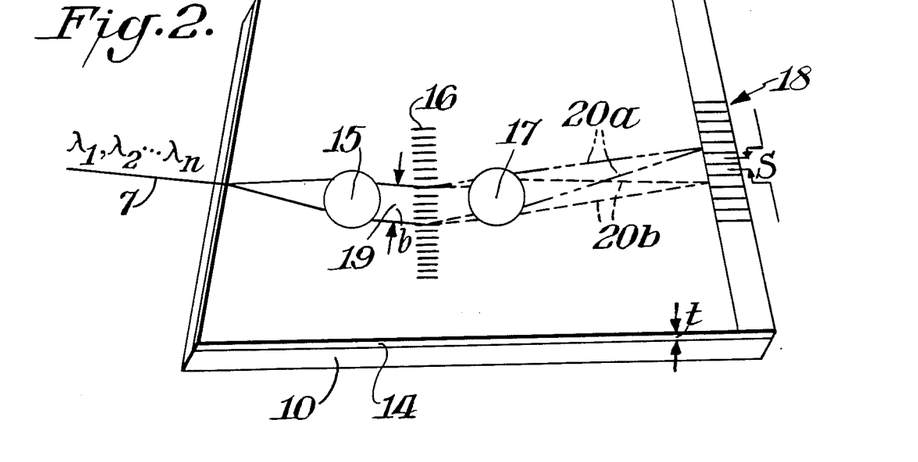
FIG. 2 is a partially schematic perspective representation of a preferred embodiment of Applicants' demultiplexer (multiplexer) in its relationship to the optical signal transmitting and receiving apparatus of FIG. 1.

Our invention is described as particularly applicable to a demultiplexing apparatus shown in FIG. 2. Here the composite signal input transmitted via optical fiber 7 is received by Applicants' radiation transmissive planar waveguide 14 which embodies, preferably in monolithic construction, an input collimating lens 15, Applicants' radiation transmissive periodic diffraction grating 16, an output focusing lens 17, a multiplicity of signal receptors denoted generally at 18, which can be a conventional photodetector array comprising individual detectors connected with preselected information receptor channels 1' to n' (not shown). The collimated input radiation spectrum beam is denoted 19, whereas two examples of the output radiation spectra are denoted 20a and 20b.

The conventional optical ray approach is taken in the following explanation of operation, it being understood that the complexities encountered in multiple optical signal processing cannot be shown adequately in drawing representation. However, Applicants' radiation transmissive diffraction grating 16 does operate in a manner which is understandable by application of the principles elucidated, thus corroborating in design what was certainly not predictable in advance by theory.

Figure 3:
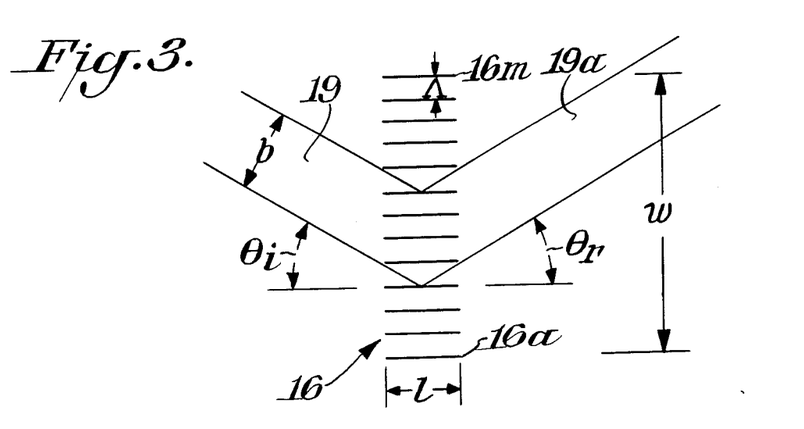
FIG. 3 is a schematic representation of the diffraction grating of FIG. 2, and FIGS. 4A, 4B, 5-7, inclusive, are ray diagrams representative of accepted principles believed applicable to Applicants' invention.

Referring to FIG. 3, Applicants' radiation transmissive diffraction grating generally comprises a multiplicity of optically reflective elements 16a to 16m which are spaced apart at regular intervals $\Lambda$ (typically 1 or 2 μm) with the grating radiation interaction length l, and width, w, very much greater than the input radiation beam 19 width b (typically 0.5 to 1.0 cm).

Grating 16 must be sufficiently long for Bragg diffraction to occur at the center wavelength in the material, $\lambda_c$. The required condition is given by the so-called thick-grating approximation:

$$1 >> \frac{\Lambda^2}{\lambda_c} = \frac{n\Lambda^2}{\lambda_{oc}} \quad (1)$$

where n is the index of refraction of the waveguiding material at the center wavelength in free-space, $\lambda_{oc}$.

For a monochromatic beam of radiation having wavelength $\lambda_o$ in free space, incident pon a grating at a given angle $\theta_i$, the maximum diffraction of the beam occurs at the Bragg Angle, $\theta_B$, given by:

$$\sin\theta_B = \frac{\lambda_o}{2n\Lambda} \quad (2)$$

assuming that the medium is optically isotropic. The same effect occurs in an optically non-isotropic material, although equation (2) would then be in tensor form to reflect the directional dependence of the medium. Such a case will not be considered further, as it is not instructive with respect to this invention.

When the Bragg Condition is satisfied, the output beam 19a will be diffracted through an angle of $2\theta_B$, or $\theta_r = \theta_B$ with respect to the grating bars. Any deviation from the Bragg Condition reduces the power of the radiation in the first order diffraction, as some of the power is directed into higher orders of diffraction. However, such losses can be tolerated to a substantial degree in the apparatus of this invention.

Figure 4A:
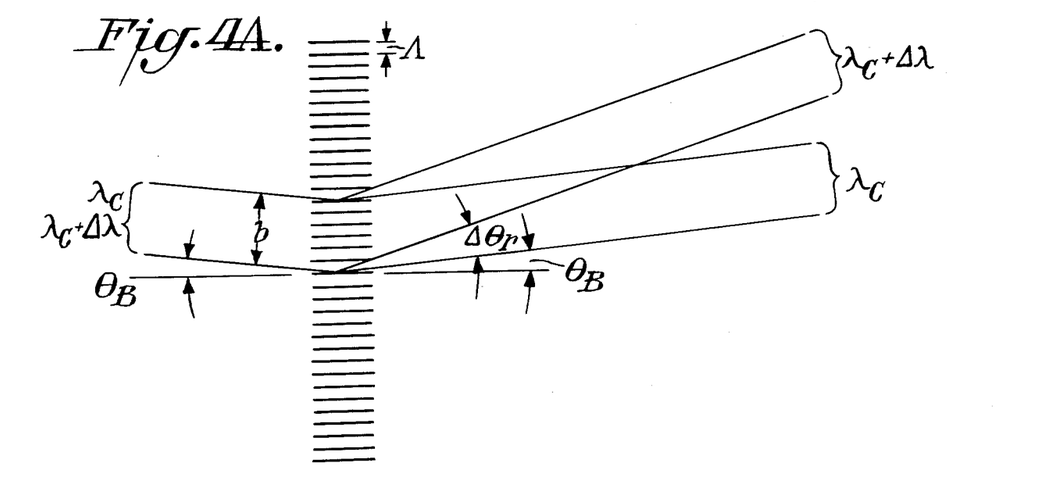

Any shift $\Delta\lambda_o$ of input wavelength from the wavelength in the material, $\lambda_c = \lambda_{oc}/n$, for which the Bragg Condition is satisfied will result in a shift $\Delta\theta_r$ in output angle, as portrayed in FIG. 4A, and some decrease in output beam intensity.

Figures 4B, 5:
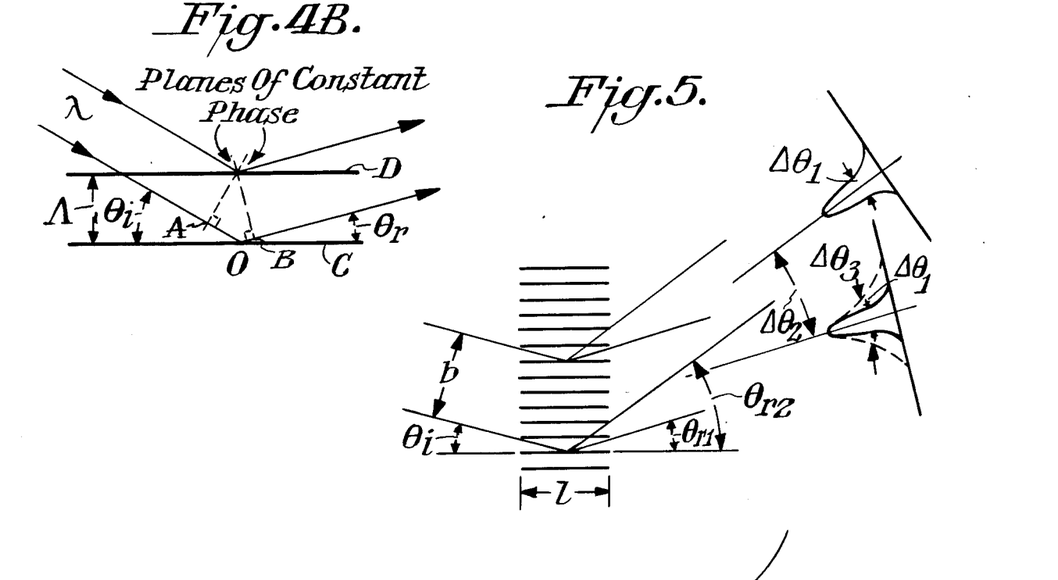

Referring to FIG. 4B, the radiation reflected from any two adjacent grating bars C and D must add up in phase along the direction of the diffracted beam. For this to occur, the path difference AO +OB of a given optical wavefront resulting from reflection from any pair of adjacent grating bars separated by a distance $\Lambda$ must be equal to an integral number of wavelengths, m. From FIG. 4B:

$$\Lambda\sin\theta_i + \Lambda\sin\theta_r = \frac{m\lambda_o}{n} \quad (3)$$

where m is the order of diffraction and n is the index of refraction of the waveguiding material for the wavelengths of interest.

Assuming first-order diffraction, i.e., m = 1, then:

$$\sin\theta_r = \frac{\lambda_o}{n\Lambda} - \sin\theta_i \quad (4)$$

Differentiating implicitly, the dispersion of the grating for an incremental change of input wavelength at a fixed input angle $\theta_i$ is given by:

$$D_{\theta_i} = \frac{\partial\theta_r}{\partial\lambda_o} = \frac{1}{n\Lambda\cos\theta_r} \quad (5)$$

To ascertain the change in output angle for a given change of input wavelength at a fixed input angle one may use a Taylor Series Expansion, ignoring all but the lowest order term, thus:

$$\Delta\theta_r \approx \frac{\partial\theta_r}{\partial\lambda_o}\Delta\lambda_o = \frac{\Delta\lambda_o}{n\Lambda\cos\theta_r} \quad (6)$$

Assuming that the center wavelength in free space, $\lambda_{oc}$, from which the other input wavelengths deviate by a small amount $\Delta\lambda_o$, enters the grating at the Bragg Angle and thus exits the grating also at the Bragg Angle, one may substitute for $\theta_B$ for $\theta_r$ in equation (6), thus:

$$\Delta\theta_r \approx \frac{\Delta\lambda_o}{n\Lambda\cos\theta_B} = \frac{\Delta\lambda_o}{n\Lambda\sqrt{1-\sin^2\theta_B}} \quad (7)$$

where the trigonometric relation $\sin^2 + \cos^2 = 1$ has been used. Substituting equation (2) into equation (7) the relation $$\Delta\theta_r \simeq \frac{\Delta\lambda_o}{n\Lambda\cos\theta_B} = \frac{2\Delta\lambda_o}{\sqrt{(2n\Lambda)^2 - \lambda_o^2}} \quad (8)$$

can be derived. It should be noted that equation (8) is valid only for conditions which satisfy or approximately satisfy the Bragg Condition as presented in equation (2).

Figure 6:
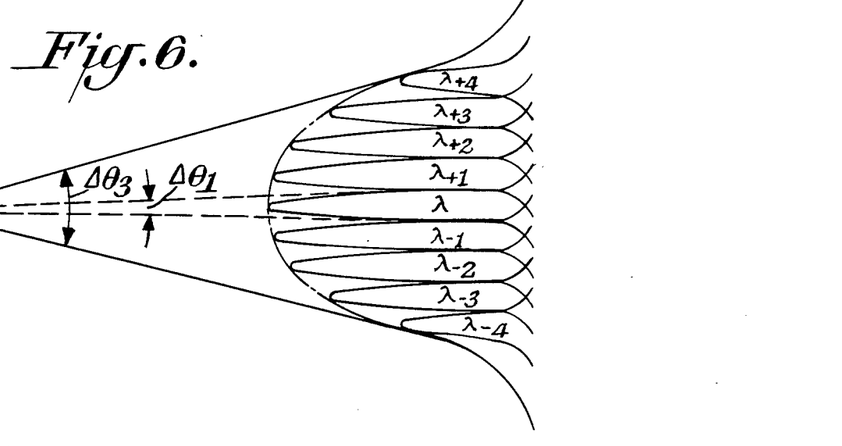

Fundamental diffraction theory (refer to R. G. Hunsperger, Integrated Optics: Theory and Technology, Springer-Verlag (1982), pp. 151-152) teaches that, if the beam width b is much greater than the grating period $\Lambda$, then the far-field pattern consists of a set of diffraction maxima with an angular half-power width given by:

$$\Delta\theta_1 = \frac{\lambda}{b} = \frac{\lambda_o}{nb} \quad (9)$$

where b is the width of the input beam and $\lambda_o$ is the wavelength of the radiation in free space. One example of a diffraction maximum is shown in FIG. 5. A set of diffraction maxima is illustrated in FIG. 6.

The radiation will undergo several orders of diffraction by the grating resulting in a series of peaks angularly separated by:

$$\Delta\theta_2 = \frac{\lambda_o}{n\Lambda} \quad (10)$$

The first and second-order diffractions are illustrated in FIG. 5, where the first-order diffraction is diffracted at an angle of $\theta_{r1}$ with respect to the grating and the second-order diffraction is diffracted at an angle of $\theta_{r2}$ with respect to the grating and at an angle of $\Delta\theta_2$ with respect to the first-order diffraction. Also shown in FIG. 5 is one diffraction spot for the first-order diffraction and one diffraction spot for the second-order diffraction, Most of the power of the incident beam will go into the first-order diffraction when the Bragg Condition is exactly satisfied. The input angle $\theta_i$ is chosen to satisfy this condition at the center wavelength $\lambda_{oc}$. As the wavelength of the input signal varies from the center wavelength by a small amount $\Delta\lambda_o$, the Bragg Condition is no longer exactly satisfied, thereby increasing amounts of optical power diffracted into other orders of diffraction, concurrently reducing the intensity of the spot diffracted into the first-order diffraction.

As shown in FIG. 6, the output radiation will be angularly scanned according to equation (8) and the intensity delivered will follow a bell-shaped pattern having an angular half-width given by:

$$\Delta\theta_3 = \frac{2\Lambda}{l} \quad (11)$$

One figure of merit, the number of resolvable spots, is given by:

$$N = \frac{\Delta\theta_3}{\Delta\theta_1} = \frac{2n\Lambda b}{\lambda_o l} \quad (12)$$

and is respresented diagramatically in FIG. 6. N represents the uppermost limit on the number of channels which can be multiplexed by a given design of the Applicants' invention. A second figure of merit for the multiplexer constitutes the angular channel separation as the magnitude of the ratio of the incremental angular dispersion of the spots differing in wavelength by an amount of $\Delta\lambda_o$ to the angular half-power width of the spots:

$$\left|\frac{\Delta\theta_r}{\Delta\theta_1}\right| \simeq \left(\frac{\Delta\lambda_o}{\lambda_o}\right)\left(\frac{b}{\Lambda\cos\theta_B}\right) = \quad (13)$$

$$\left(\frac{\Delta\lambda_o}{\lambda_o}\right)\left(\frac{2nb}{\sqrt{(2n\Lambda)^2 - \lambda_o^2}}\right)$$

Figure 7:
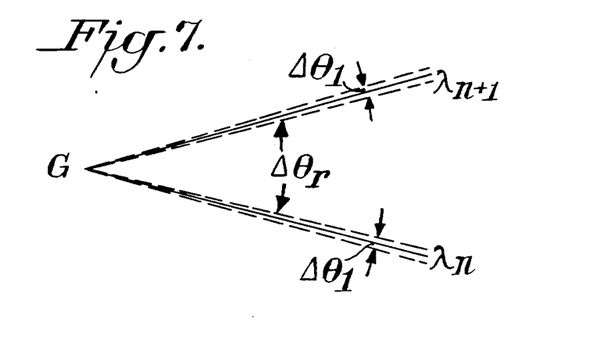

This is illustrated in FIG. 7. The greater the ratio given in equation (13) the less the diffraction spots will overlap, and, hence, the cross-talk between channels will be reduced. A value of 5 or greater should be sufficient for most designs.

The dimensions of the individual photodetectors, or their equivalent, in array 18 is determined by the spot-size P and the spatial separation S of the output channels. Both P and S are functions of the focal length F of the focusing output lens 17. Assuming the system uses a near-diffraction-limited lens, the output spots will be separated by an amount:

$$S = \Delta\theta_r F = \frac{2\Delta\lambda_o F}{\sqrt{(2n\Lambda)^2 - \lambda_o^2}} \quad (14)$$

where $\Delta\theta_r$ is in radian units. The output spot size P will be:

$$P = g\Delta\theta_1 F = \frac{g\lambda_o F}{nb} \quad (15)$$

where $\Delta\theta_l$ is in radian units and g is a constant determined by the definition of the optical focal spot resolution. For a Gaussian output beam truncated at the 3 dB points, g=1. For a Gaussian beam truncated at 1/e points in the Fourier transform plane, g=1.21. At the $1/e^2$ points, g=1.64, and if the beam is truncated at the full main lobe spot size, g=2.48.

The photodetectors or their equivalents for a demultiplexer should be spaced at regular intervals, with center-to-center spacing determined by the value of S. The detectors or their equivalents should be larger than the value of P, so as to capture the maximum amount of the signal available, and smaller than the value of S so that the output devices do not overlap. For a multiplexing device, the appropriate optical sources would be placed on centers determined by S.

In designing a planar transmission grating wavelength-division multiplexer (or demultiplexer), the following considerations apply:

(1) A large Bragg Angle, $\theta_B$, for the center wavelength, $\lambda_{oc}$, yields the maximum angular scan for a change in wavelength, $\Delta\lambda_o$, according to equation (8).

(2) A small angular half-power width of diffraction maxima, $\Delta\theta_1$, yields well-defined spots and thus increases the number of resolvable spots according to equation (12).

(3) A large angular half-power width of intensity maximum of the angularly scanned beam, $\Delta\theta_3$ (refer to FIG. 6), permits a large scan range which increases the number of resolvable spots and hence the maximum number of channels a given multiplexer/demultiplexer design can support.

(4) A large angular separation of peaks (which are coincident with the beam centers) for higher-order diffractions, $\Delta\theta_2$ (refer to FIG. 5), decreases the optical power lost from the first-order diffraction, thereby decreasing device insertion loss.

To build the system, it is feasible to butt-couple to the planar waveguide 14 (see FIG. 2) an input optical fiber 7 polished at its distal end to provide a lens effective to cause radiation divergence to the beam width desired. An optical waveguide consists of a material with low attenuation at the wavelengths of interest surrounded by materials of lesser refractive index to produce total internal reflection of the optical signal, thus guiding the optical wave (refer to T. Tamir, Integrated Optics, Springer-Verlag (1979), pp. 15–61). Waveguide 14 is preferably designed to be single-mode for the radiation wavelengths to be transmitted, although this is not essential to device operation. The waveguide 14 is formed on the substrate 10 which provides mechanical support. Waveguide 14 can be sputter deposited or deposited from solution on an optical flat. Using glass optical flats for the substrate 10, dopant diffusion, ion exchange, and ion implantation can be used to form a thin region with index of refraction greater than that of the substrate to form the waveguide 14. Using semiconductor materials for the substrate 10 (which permits monolithic integration of electronic devices into the multiplexer system), waveguides can be fabricated by both sputter and solution deposition of multilayer structures having the required change of refractive index to cause waveguiding, as well as carrier concentration reduction via proton bombardment and epitaxial growth. The passive semiconductor (incapable of photon generation through stimulated emission) silicon presents a unique advantage for use as a substrate in that a waveguide can be produced on a layer of thermally grown silicon dioxide which has low refractive index and serves as an isolation layer between the waveguide and the silicon substrate, reducing optical power loss by reducing the penetration of the evanescent tail of the optical signal into the silicon substrate.

Waveguide 14 should possess low attenuation at the optical wavelengths at which it is to function (typically at wavelengths ranging from 0.8 to 1.5 $\mu$m). Operative waveguide materials include optical glasses, lithium niobate, lithium tantalate, silicon dioxide, silicon oxynitride, tantalum pentoxide, niobium pentoxide, polymethylmethacrylate (PMMA), photoresist, polyurethane epoxy, the polymerized organic monomers vinyltrimethylsilane (VTMS) and hexamethyldisiloxane (HMDS), the passive (incapable of photon generation) semiconductor materials silicon, zinc selenide, and zinc telluride, and the active (capable of photon generation) semiconductor materials gallium arsenide, gallium aluminum arsenide, gallium indium arsenide, gallium indium phosphide, gallium arsenide phosphide, and gallium indium arsenide phosphide.

Lenses 15 and 17 can be of a number of conventional varieties. The most appropriate lens types are geodesic and Luneburg lenses. The geodesic lens is produced by grinding an appropriately shaped depression into the substrate 10 surface prior to formation of the waveguide 14. Geodesic lenses are not appropriate for use with semiconductor substrates because of the grinding involved. Luneburg lenses are deemed most appropriate for use with semiconductor substrates as they are formed by depositing a circularly symmetric protrusion of high refractive index material on the surface of the isolation layer prior to deposition of the waveguiding layer. It is also possible to fabricate by conventional means (ion implantation, proton bombardment, dielectric strip-loading or topographic inhomogeneity) acceptable geometric lenses by forming an appropriately shaped region on or in the waveguide having an effective index of refraction sufficiently different from the waveguide 14 for optical refraction to occur at the lens/waveguide boundary.

Grating 16 can likewise be fabricated by different conventional methods, e.g., (1) etching grating bars into the waveguide surface either chemically or via ion milling, (2) depositing metal or dielectric bars on the surface of the waveguide, (3) inducing a surface acoustic wave of preselected period via a piezoelectric or magnetostrictive transducer, (4) using the electrooptic effect to produce a periodic variation of the refractive index of the waveguide 14 by applying an electric potential across interdigitiated contacts deposited on the waveguide surface or across finger contacts deposited on the waveguide surface using the substrate material as a ground plane, or (5) other methods effective to cause a controlled periodic variation of the refractive index of the waveguide.

As hereinbefore mentioned, the apparatus of this invention can be optionally employed to either multiplex or demultiplex optical signals via wavelength-division.

For multiplexing optical sources onto a single optical fiber, it is practicable to either couple lasers or LED optical sources (appropriately focused using lenses) or integrate these optical sources monolithically onto the planar substrate 10. This latter option requires that the substrate on which the waveguide 14 is formed be an active semiconductor material (capable of stimulated photon emission) such as gallium arsenide, gallium aluminum arsenide, gallium indium arsenide, gallium indium phosphide, gallium arsenide phosphide, gallium indium arsenide phosphide, or other Group III-V and II-VI (binary, ternary, or quaternary) direct (or near-direct) bandgap materials. It is also practicable to couple optical fibers from remote optical sources to the waveguide as inputs, although this may result in unacceptable optical power loss. Coupling of input or output devices to the waveguide can be achieved in several ways (refer to R. G. Hunsperger, ibid, pp. 88–106). Common methods include (1) butt-coupling directly to the exposed edge of the waveguide; (2) coupling via a prism through the planar waveguide surface; (3) coupling via a grating through the waveguide surface; (4) coupling via a tapered film coupler.

Operation of the system of the Applicants' invention as a multiplexer is essentially the reverse of operation for the demultiplexing embodiment as hereinbefore described. Referring to FIG. 2, optical sources are substituted for the photodetector receivers 18, placed on centers S, as determined by equation (14). The optical sources are amplitude modulated by conventional means according to the information to be transmitted. Semiconductor laser diodes are deemed to be particularly applicable to our invention due to their narrow spectral response and potential for single-mode operation. This does not, of course, preclude the use of other types of laser sources. LED optical sources would require the use of significantly greater interchannel spacings due to their broader spectral response and reduced output directionality, thus reducing the multiplexing efficiency of the Applicants' invention.

The modulated optical signal outputs from the optical sources are permitted to diverge within the waveguide 14 until they are of the appropriate beam width, at which point the lens 17 collimates the beams and directs them onto the periodic radiation transmissive diffraction grating 16. It is of primary importance that the output from each optical source be directed along the correct angular course when it reaches the grating 16. These angular courses are identical to the angular courses taken by the signals of corresponding wavelengths exiting the grating when the Applicants' invention is used in the demultiplexing embodiment, and, hence, equations (1) through (8) inclusive are applicable, noting, of course, the reversed roles of the input and output with respect to the grating.

Upon exiting the grating 16, the multiplicity of optical signals which have undergone first-order diffraction will follow an angular course determined by the Bragg Angle of the center wavelength in free space, $\lambda_{oc}$, and will enter the lens 15 which will focus it onto the fiber 7 which serves as an output. The output fiber 7 must have sufficiently large numerical aperture to accept the multiplexed output signal.

Employed as a demultiplexer, the apparatus requires photodetectors 18 or output fibers of high numerical aperture coupled to the waveguide. Coupling can be achieved by one of the aforementioned methods. Here again, it is possible to monolithically integrate the photodetector receivers 18 into the substrate 10 on which the planar waveguide 14 is fabricated. This option would limit the choice of substrates to materials such as semiconductors with effective bandgap sufficiently small to absorb the wavelengths of interest in such a manner that a collectible electron-hold pair is formed. It is not necessary that such a semiconductor be a direct or near-direct bandgap active semiconductor material as in the case of monolithically integrated optical sources. Thus, operable substrate materials useful for monolithic integration of electronic semiconductor devices into the Applicants' wavelength-division demultiplexing system include the passive (incapable of photon generation through stimulated emission) semiconductor materials silicon, germanium, zinc selenide, and zinc telluride, as well as the active (capable of photon generation through stimulated emission) semiconductor materials gallium arsenide, gallium aluminum arsenide, gallium indium arsenide, gallium indium phosphide, gallium arsenide phosphide, and gallium indium arsenide phosphide. The passive semiconductor germanium has a very high index of refraction (n≈4.0), which is much greater than the refractive index of most waveguiding materials. Hence, if germanium is chosen as the substrate 10, an optically isolating layer of a material with low refractive index will be required between the sustrate 10 and the waveguide 14 to ensure that power from the optical signal is not undesirably coupled from the waveguide 14 into the substrate 10. The use of an optically isolating layer between the waveguide 14 and the semiconductor substrate 10 is, in general, desirable, as this decreases loss of the optical signal from the waveguide by reducing the penetration of the evanescent tail of the signal into the highly absorptive semiconductor material. Additionally, the use of an optically isolating layer permits the designer to choose the waveguiding material independent of the refractive index of the substrate.

In addition to photodetector receiver outputs 18, the demultiplexing embodiment of the Applicants' invention can use optical fibers as passive outputs, directing the individual channels from the demultiplexer to other devices. The fibers can be coupled to the planar waveguide 14 by one of the aforementioned methods and would have to be of high numerical aperture to accept the demultiplexed output. It is also practicable to use optical amplifier repeaters before feeding the demultiplexed signal into optical fiber outputs. Optical amplifier repeaters have been produced by injecting the optical signal to be amplified into an electronic circuit element in the bias network of a semiconductor laser diode so as to control the output of the laser (refer to H. Matsueda and M. Nakamura, "Monolithic integration of a laser diode, photo monitor, and electric circuits on a semi-insulating GaAs substrate," Applied Optics, Vol. 23, No. 6, pp. 779–781 (1984)). This configuration is most efficient if such optical repeaters are monolithically integrated into a planar substrate of active semiconductor material.

EXAMPLE

The following apparatus, shown partly schematically in FIG. 2, illustrates the design principles applicable to this invention in demultiplexing service.

The preselected center wavelength in free space, $\lambda_{oc}$, is chosen as 1.3 μm (1300 nm) in the region where the transmitting optical fiber has very low attenuation and no chromatic dispersion. The interchannel spacing, or spacing between wavelengths of individual channels, $\Delta\lambda_o$, is chosen as 10 nm, although it will be understood that the apparatus can be designed to demultiplex (or multiplex) either much larger or much smaller channel widths. This choice of channel width yields optical carrier channels which have their peak spectral outputs centered on free space wavelengths 1.30, 1.31, 1.32, 1.33 μm and so on, for channels $\lambda_{oc}$, $\lambda_{oc+1}$, $\lambda_{oc+2}$, and $\lambda_{oc+3}$, respectively.

The planar waveguide 14 is chosen to be 10 μm thick sputtered silicate optical glass with index of refraction n=1.46 to match the refractive index and core diameter of the optical fiber 7. Substrate 10 is chosen as optical glass with index of refraction n≦1.495 to keep the waveguide 14 single mode. It will be understood that it is not essential to make the waveguide 14 single mode, nor is it necessary to match the fiber 7 characteristics, this being resorted to by way of optimization in this example. The substrate 10 should have a very fine optical polish so that there are a minimum of surface irregularities which might cause scattering of the optical signals propagating within the waveguide 14.

The radiation reflective grating bars are etched into the waveguide surface in periodically spaced array to form the radiation transmissive periodic diffraction grating 16 which causes the diffraction of the input beam 19. The topographic inhomogeneity produced by etching the surface of the waveguide 14 changes the effective refractive index of the waveguide, providing a radiation reflective element within the waveguide 14. Grating 16 is chosen to have 15 μm long bars spaced on a 1.5 μm period and is fabricated using conventional photolithographic procedures to form a photoresist mask on the waveguide surface. The waveguide surface is then etched chemically 1.5 μm deep. Optionally, ion beam milling, with its greater control over etch depth, can be substituted for the chemical etch.

The optical beam 19 entering the grating 16 is preselected to be 5 mm wide. Beam entrance angle is selected to be $\theta_i=17.266°$ with respect to the grating. The center wavelength in free space, $\lambda_{oc}$, then exits the grating at an angle $\theta_{rc}=17.266°$. The angular channel separation $\Delta\theta_r$ is 0.2740°. The angular half-power width of the individual channels $\Delta\theta_1$ is only 0.0102° yielding very well-defined spots. The ratio presented in equation (13) is 26.85, that is to say, the individual channels are angularly separated more than twenty-six times greater than an output beam of an individual channel is diverging. This leads to very low crosstalk between individual channels.

A geodesic lens is chosen as the focusing output lens 17. Such lenses are ideal for this application as their properties are independent of wavelength or optical mode, unlike other common lenses used for integrated optical circuits. The lens selected has a focal length 15 mm and a useful aperture of 10 mm, yielding an f number of 1.5. The center of the output lens 17 is located 20 mm from the grating 16 in such a position that the center of the output beam 19a (FIG. 3) for the center wavelength in free space $\lambda_{oc}$ is coincident with the optical axis of the output lens. The spatially outermost beams (diffracted by the grating at angles $+20\ \Delta\theta_r$ from the output beam at the center wavelength) are thus 1.91 mm off axis at the output lens center, so that the entirety of the beams fall well within the useful aperture of the output lens.

Under the foregoing conditions, the individual information channels are separated by 71.73 μm and the spot size is 6.62 μm. Photodetector receivers 18 are 60 μm wide separated by 11.73 μm. This design allows for wavelength drift of up to 5.5 nm, i.e., greater than +50% of the channel width without significant increase of crosstalk between channels.

This relatively simple device is capable of demultiplexing 41 channels, i.e., double the current state-of-the-art, over a wavelength range 1.1–5 μm. In fact, the number of resolvable spots for this design is in excess of 1100, limiting the apparatus capability only by channel width imposed by drift of the associated optical sources and the limitations of optical lens and microelectronic device fabrication.

A different example of wavelength-division demultiplexing is the use of the Applicants' invention in spectral analysis. A polarized and collimated input of electromagnetic radiation having unknown wavelength components (such as that radiated by an alloy of unknown composition at high temperatures) can be segregated by the Applicants' invention to determine its exact spectral composition. The preferred embodiment for a spectrometer using a planar transmission diffraction grating would use a piezoelectric (or magnetostrictive) transducer to induce a surface acoustic wave in the planar waveguide hereinbefore described to cause a periodic variation of the refractive index of the guide. This permits the device to be tuned to the appropriate wavelengths, permitting a broader range of spectral analysis. Such an embodiment of this device would require in addition optical sources of known wavelength for reference inputs to tune the spectrometer.

In summary, the principal advantages of our planar radiation transmissive grating wavelength-division multiplexer (demultiplexer) over the current state-of-the-art comprise:

(1) It can multiplex, or demultiplex, a far greater number of information channels than existing devices, thereby making much better use of the "window" of attenuation of the optical fiber and significantly reducing the cost per channel of fiber optic communications.

(2) It can be designed to process optical signals with interchannel spacing (or the spacing between centers of the output spectra wavelengths of individual channels) from very small (less than 1nm) to very large (about 100 nm).

(3) It can be fabricated with simplicity and economy in planar integrated construction, including optical sources, detectors, and associated electronic devices, using conventional techniques.

(4) Use of a planar waveguide provides superior optical confinement of the signal in comparison to other wavelengthdivision multiplexing systems, reducing loss of the optical signal.

(5) It can be made single mode, thereby benefitting from the advantages of this approach.

(6) It possesses mechanical stability because the alignment of all components is fixed during manufacture.

(7) It has small size and low weight.

(8) The radiation transmissive diffraction grating is simpler to fabricate than the machine ground reflection diffraction gratings hitherto employed.

(9) Our radiation transmissive periodic diffraction grating subjects the optical beams in process to a larger grating area than reflection gratings, yielding efficient diffraction, thus giving improved resolution.

(10) No complicated filters or troublesome antireflection coatings are required in our apparatus.

(11) It can be made totally passive, i.e., requiring no external power supply.

It will be understood that this invention can be modified widely without departure from its essential principles.

What is claimed is:

1. A wavelength-division system comprising a radiation transmission planar waveguide provided with a single collimating lens and a single focusing lens and with a periodic radiation transmissive passive diffraction grating incorporating a multiplicity of radiation reflecting elements in spaced array preselected, and of length sufficient for Bragg diffraction to occur at the center wavelength in the material as defined by the following formula:

$$1 >> \frac{\eta\Lambda^2}{\lambda_{oc}}$$

and the length is sufficiently short to permit a large angular scanning range as defined by the following formula $$\Delta\theta_3 = \frac{2\Lambda}{1}$$

wherein 1 is the length of each radiation reflecting element
λoc is the center wavelength in the free space
n is the index of refraction of the wave guiding material at λoc
Λ is the regular interval of the spaced radiation reflection elements,
$\Delta\theta_3$ is the angular scanning range said passive diffraction grating being in demultiplexing service, to separate, via the wavelength-dependent angular dispersion of said diffracting grating, into individual entities an optical signal input constituting a multiplicity of coherent radiation signals of different characteristic wavelenghts transmitted simultaneously via said radiation transmissive planar waveguide and, in multiplexing service, to consolidate, via angular dispersion, a multiplicity of coherent radiation signals from optical sources individually introduced to said transmissive diffraction gating via said radiation transmissive planar waveguide along angular courses substantially coincident with the angular courses taken by individual radiation signals of corresponding wavelengths exiting said transmissive diffraction grating in said demultiplexing service, and means directing said signals to dedicated receptors.

2. A wavelength-division system according to claim 1 wherein said periodic diffraction grating radiation reflecting elements are oriented in space so that, in said demultiplexing service, said radiation incident on said diffraction grating is at substantially the Bragg Angle of the central wavelength of said multiplicity of coherent radiation signals of different characterisitc wavelengths and, in said multiplexing service, said radiation exiting said diffraction grating is substantially at said Bragg Angle of said central wavelength of said multiplicity of coherent radiation signals of different characteristic wavelengths.

3. A wavelength-division system according to claim 1 wherein said planar radiation transmissive waveguide, said periodic radiation transmissive diffraction grating, said waveguide focusing and collimating lenses, said dedicated receptors, and said optical sources are fabricated in monolithic integrated configuration within or upon a single substrate of semiconductor material.

4. A wavelength-division system according to claim 3 wherein said semiconductor material is one of the group consisting of the passive (incapable of photon generation through stimulated emission) semiconductors silicon, germanium, zinc selenide, and zinc telluride, or the active (capable of photon generation through stimulated emission) semiconductors gallium arsenide, gallium aluminum arsenide, gallium indium arsenide, gallium indium phosphide, gallium arsenide phosphide, and gallium indium arsenide phosphide.

5. A wavelength-division system according to claim 1 wherein, in said demultiplexing service, said dedicated receptors are one of the group consisting of photodetectors, optical fibers, and optical amplifier devices, and in said multiplexing service, said dedicated receptor is an optical fiber.

6. A wavelength-division system according to claim 1 wherein said optical sources are one of the group consisting of lasers and light emitting diodes.

7. A wavelength-division system according to claim 1 wherein said planar radiation-transmissive waveguide is single mode.

8. A wavelength-division system according to claim 1 or claim 7 wherein said waveguide is fabricated from one of the group consisting of optical glass, lithium niobate, lithium tantalate, silicon dioxide, silicon oxynitride, tantalum pentoxide, niobium pentoxide, polymethylmethacrylate (PMMA), photoresist, polyurethane epoxy, the polymerized organic monomers vinyltrimethylsilane (VTMS) and hexamethyldisiloxane (HMDS), or a semiconductor of the group consisting of silicon, gallium arsenide, gallium aluminum arsenide, gallium indium arsenide, gallium indium phosphide, gallium arsenide phosphide, gallium indium arsenide phosphide, zinc selenide, and zinc telluride.

9. A wavelength-division system according to claim 1 wherein said optical signal processed has an interchannel spacing in the range of about 1 nm to about 100 nm.

10. A method of wavelength division for demultiplexing comprising transmitting an optical signal input constituting a multiplicity of coherent radiation signals of different characteristic wavelengths simultaneously via a radiation transmissive planar waveguide through a planar periodic radiation transmissive passive diffraction grating having a multiplicity of radiation reflective elements in preselected space array and of a length sufficient for Bragg diffraction to occur at the center wavelength in the material as defined by the following formula $$1 >> \frac{\eta \Lambda^2}{\lambda oc}$$

and the length is sufficiently short to permit a large angular scanning range as defined by the following formula $$\Delta \theta_3 = \frac{2\Lambda}{1}$$

wherein
  1 is the length of the radiation reflecting element
  $\lambda oc$ is the center wavelength in free space
  n is the index of refraction of the wave guiding material at $\lambda oc$
  $\Lambda$ is the regular interval of the spaced radiation reflecting elements,
  $\Delta \theta_3$ is the angular scanning range
  said passive diffraction grating being to segregate said signals into individual entities via the wavelength-dependent angular dispersion of said diffraction grating, and thereafter routing said signal entities to individual dedicated receptors.

11. A method of wavelength division for multiplexing a multiplicity of individual optical radiation signals of different characteristic wavelengths according to claim 10 comprising introducing said signals via a radiation transmissive planar waveguide through a periodic radiation transmissive diffraction grating along angular courses substantially the same as those taken by individual radiation signals exiting from said diffraction grating in demultiplexing according to claim 10, and thereafter routing the consolidated signal to a dedicated receptor.

* * * * *